UNITED STATES PATENT OFFICE.

MAX FREMERY AND JOHANNES URBAN, OF OBERBRUCH, GERMANY.

PROCESS OF MANUFACTURING CELLULOSE PRODUCTS.

SPECIFICATION forming part of Letters Patent No. 650,715, dated May 29, 1900.

Application filed February 6, 1900. Serial No. 4,259. (No specimens.)

*To all whom it may concern:*

Be it known that we, MAX FREMERY, a subject of the King of Prussia, Emperor of Germany, and JOHANNES URBAN, a subject of the Emperor of Austria-Hungary, both residing at Oberbruch, near Aachen, in the German Empire, have invented certain new and useful Improvements in Processes of Manufacturing Cellulose Products; and we do hereby declare the following to be a full, clear, and exact description of the invention, such as will enable others skilled in the art to which it appertains to make and use the same.

Our invention relates to new and useful improvements in the manufacture of glossy threads, fibers, films, and other similar products obtained from cellulose dissolved in cellulose solvents; and it consists especially in improvements in and relating to the drying of such cellulose products.

In order to obtain more solid or firmer and more glossy cellulose products from cellulose which is separated or precipitated from solvents thereof—such as, for example, solution of chlorid of zinc or of cupra ammonium or of any other solvent—or from hydrocellulose or the various hydrates of cellulose or amyloid. These cellulose products after their manufacture are dried at a temperature not exceeding about 40° centigrade. This process, which, although an invention of ours, is not the subject of this application, can be promoted by employing a vacuum or a current of air. These cellulose products—such as threads, fibers, films, and the like—are kept under tension by being wound on rollers or spools while they are subjected to this drying process, the cylindrical rollers everywhere acting uniformly in opposition to the natural contraction which takes place, while the gradual removal of water produces a uniform tension of the thread, fiber, or the like throughout, which is necessary to obtain a high gloss and close similarity to silk.

In practical experiments with the process referred to we have observed that the drying takes place in two stages or phases. A first part of the water contained in the threads evaporates fairly rapidly. The greater part, however, only evaporates very slowly. We concluded from this that this larger part of the contained water is in a fixed, possibly chemical, combination with the cellulose. This slowly-evaporating part of the water may therefore be called here "water of hydration of the cellulose." Further experiments were therefore undertaken with the view of rendering the "water of hydration" at least more loose in its combination with the cellulose, in order, possibly, by these means to evaporate this firmly-united quantity of water contained in the cellulose products more rapidly than or as rapidly as the first part of the water contained therein. The desired result cannot be attained by a simple elevation of the temperature of the drying-chamber, since a browning or discoloration of the cellulose thread will then take place and the gloss and firmness thereof will be deteriorated. In these experiments we discovered or invented the following process, forming the subject of our present application:

The cellulose threads, fibers, films, or the like obtained in any suitable or known manner from cellulose solution are while freshly produced in a more or less gelatinous condition. According to the present invention these products are subjected to the action of water (liquid or vaporous) at an elevated temperature (about 80° centigrade to about 100° centigrade) and are then dried at a comparatively-low temperature, not exceeding 40° centigrade.

The process may be performed in the manner which we will now explain by way of example. The rollers on which the said more or less gelatinous cellulose products are wound during their manufacture are dipped for a short time in hot water (at a temperature of from 80° to 100° centigrade) or brought into contact with a current of steam—that is to say, the rollers on which the manufactured cellulose products are wound are subjected to the action of a high temperature (from 80° to 100° centigrade) in the presence of water, (liquid or gaseous.) By this action the whole of the water is now easily removed by drying. After this treatment the cellulose threads, films, or the like on the rollers are dried by subjecting these rollers or spools to a moderate heat, (up to about 40° centigrade,) preferably in suitable drying-chambers, wherein this drying may be promoted by employing a vacuum or an accelerated change of the air, (attained by ventilation.)

By employing the preliminary treatment above mentioned (action of a high temperature in the presence of water) for this drying process only about a quarter of the time heretofore required for the latter is necessary. The threads or films obtained also have a high degree of firmness or solidity and a silk-like gloss.

We claim as our invention—

1. The process of imparting a glossy appearance and a comparatively-great strength to cellulose products obtained from cellulose solutions, such process consisting in subjecting the said products for a short time to the action of water at an elevated temperature from about 60° to about 100° centigrade and then drying such products at a comparatively-low temperature not exceeding about 40° centigrade, substantially as and for the purpose set forth.

2. The process of imparting a glossy appearance and a comparatively-great strength to cellulose products obtained from cellulose solutions, such process consisting in winding up these cellulose articles while freshly produced, subjecting these cellulose products while wound up to the action of water at an elevated temperature from about 60° to about 100° centigrade and then drying the same at a comparatively-low temperature not exceeding about 40° centigrade, substantially as and for the purpose set forth.

In testimony whereof we affix our signatures in presence of two witnesses.

M. FREMERY.
JOHANNES URBAN.

Witnesses:
  E. M. BRUNDAGE,
  C. E. BRUNDAGE.